United States Patent
Yuan (10) Patent No.: US 11,206,382 B2
(45) Date of Patent: Dec. 21, 2021

(54) WHITE BALANCE SYNCHRONIZATION METHOD AND APPARATUS, AND TERMINAL DEVICE

(71) Applicant: GUANGDONG OPPO MOBILE TELECOMMUNICATIONS CORP., LTD., Guangdong (CN)

(72) Inventor: Quan Yuan, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 54 days.

(21) Appl. No.: 16/733,628

(22) Filed: Jan. 3, 2020

(65) Prior Publication Data
US 2020/0145633 A1    May 7, 2020

Related U.S. Application Data

(63) Continuation of application No. PCT/CN2018/090587, filed on Jun. 11, 2018.

(30) Foreign Application Priority Data

Jul. 10, 2017   (CN) .......................... 201710558403.1

(51) Int. Cl.
H04N 9/73      (2006.01)
H04N 9/09      (2006.01)
(Continued)

(52) U.S. Cl.
CPC ........... *H04N 9/735* (2013.01); *H04N 5/2258* (2013.01); *H04N 5/23245* (2013.01); *H04N 9/09* (2013.01)

(58) Field of Classification Search
CPC ........ H04N 9/735; H04N 9/09; H04N 5/2258; H04N 5/23245
See application file for complete search history.

(56) References Cited

U.S. PATENT DOCUMENTS 8,654,222 B2 *   2/2014  Kuwazoe ........... H04N 5/23229
                                                           348/262
8,711,238 B2 *   4/2014  Crook .................. H04N 13/239
                                                           348/211.3
(Continued)

FOREIGN PATENT DOCUMENTS

CN        101711482 A      5/2010
CN        103402102 A      11/2013
(Continued)

OTHER PUBLICATIONS

International Search Report in the International application No. PCT/CN2018/090587, dated Aug. 8, 2018.
(Continued)

*Primary Examiner* — Brian P Yenke (57) ABSTRACT

Disclosed are a white balance synchronization method and apparatus, and a terminal device. The method is applied to a terminal comprising at least two cameras, and comprised that: when it is determined that the terminal is about to switch a camera, obtaining a first gain value corresponding to a currently used first camera; and after a second camera is started, using the first gain value as an initial value, and performing white balance adjustment is performed on an image collected by the second camera. Therefore, after the camera is switched, the second camera performs convergence by using gain value of the first camera prior to the switching as an initial value so as to perform the white balance adjustment, thereby avoid the problem of image flickering, improving the white balance adjustment speed and improving the user experience.

14 Claims, 3 Drawing Sheets

(51) Int. Cl.
*H04N 5/225* (2006.01)
*H04N 5/232* (2006.01)

(56) References Cited

U.S. PATENT DOCUMENTS

| | | | | |
|---|---|---|---|---|
| 9,088,756 | B2* | 7/2015 | Huang | H04N 9/735 |
| 9,247,223 | B2* | 1/2016 | McCrackin | H04N 5/23245 |
| 9,615,071 | B2* | 4/2017 | Chen | H04N 1/603 |
| 9,686,523 | B2* | 6/2017 | Kim | H04N 5/23216 |
| 9,819,874 | B2* | 11/2017 | Chien | G03B 7/17 |
| 9,906,701 | B2 | 2/2018 | Spielberg | |
| 10,189,913 | B2* | 1/2019 | Aghaei Moghadam | C22B 1/2406 |
| 10,455,206 | B2* | 10/2019 | Yuan | H04N 9/735 |
| 10,491,874 | B2* | 11/2019 | Wang | G02B 27/646 |
| 10,559,092 | B2* | 2/2020 | Yuan | H04N 1/642 |
| 10,574,960 | B2* | 2/2020 | Wang | H04N 1/6027 |
| 10,798,288 | B2* | 10/2020 | Chou | H04N 5/243 |
| 10,798,356 | B2* | 10/2020 | Wang | H04N 1/6086 |
| 10,798,358 | B2* | 10/2020 | Wang | H04N 5/2259 |
| 10,951,833 | B2* | 3/2021 | Yuan | H04N 5/247 |
| 2003/0234866 | A1 | 12/2003 | Cutler | |
| 2006/0268131 | A1 | 11/2006 | Cutler | |
| 2007/0025714 | A1 | 2/2007 | Shiraki | |
| 2008/0231726 | A1 | 9/2008 | John | |
| 2009/0015689 | A1 | 1/2009 | Murayama | |
| 2015/0049211 | A1* | 2/2015 | Lim | H04N 5/23229 348/211.1 |
| 2015/0116534 | A1* | 4/2015 | Kim | H04N 1/6086 348/223.1 |
| 2016/0182874 | A1* | 6/2016 | Richards | G06T 7/80 348/187 |
| 2016/0241793 | A1 | 8/2016 | Ravirala et al. | |
| 2017/0171442 | A1 | 6/2017 | Spielberg | |
| 2017/0264821 | A1* | 9/2017 | An | H04N 5/232 |
| 2017/0272644 | A1* | 9/2017 | Chou | H04N 7/181 |
| 2017/0359494 | A1 | 12/2017 | Zhou et al. | |
| 2018/0183982 | A1 | 6/2018 | Lee et al. | |
| 2018/0241980 | A1 | 8/2018 | Lee et al. | |
| 2018/0294292 | A1* | 10/2018 | Zhou | H01L 27/1259 |
| 2018/0332223 | A1 | 11/2018 | Lin et al. | |
| 2018/0343382 | A1* | 11/2018 | Cohen | H04N 5/0733 |
| 2019/0014270 | A1* | 1/2019 | Yuan | G06T 7/50 |
| 2019/0037189 | A1* | 1/2019 | Yuan | H04N 1/6077 |
| 2019/0191080 | A1* | 6/2019 | Moriya | H04N 9/04515 |
| 2019/0191106 | A1* | 6/2019 | Dabral | H04N 5/232 |
| 2019/0335150 | A1* | 10/2019 | Shin | G06T 7/248 |
| 2020/0027202 | A1* | 1/2020 | Oh | G06T 5/002 |
| 2020/0120321 | A1* | 4/2020 | Tian | H04N 5/243 |
| 2020/0137369 | A1* | 4/2020 | Yuan | G06K 9/00281 |
| 2020/0154022 | A1* | 5/2020 | Yuan | H04N 5/2352 |
| 2020/0154086 | A1* | 5/2020 | Yuan | G06T 7/13 |
| 2021/0195155 | A1* | 6/2021 | Yuan | H04N 1/6077 |

FOREIGN PATENT DOCUMENTS

| | | |
|---|---|---|
| CN | 103402103 A | 11/2013 |
| CN | 104394392 A | 3/2015 |
| CN | 104618645 A | 5/2015 |
| CN | 104954661 A | 9/2015 |
| CN | 105282451 A | 1/2016 |
| CN | 105657392 A | 6/2016 |
| CN | 105721846 A | 6/2016 |
| CN | 105744247 A | 7/2016 |
| CN | 105959553 A | 9/2016 |
| CN | 106231279 A | 12/2016 |
| CN | 106254765 A | 12/2016 |
| CN | 106375661 A | 2/2017 |
| CN | 106506957 A | 3/2017 |
| CN | 106791341 A | 5/2017 |
| CN | 106911892 A | 6/2017 |
| CN | 107277355 A | 10/2017 |
| CN | 107277480 A | 10/2017 |
| EP | 2760208 A1 | 7/2014 |
| JP | 2001215549 A | 8/2001 |
| JP | 2005215039 A | 8/2005 |
| JP | 2010119042 A | 5/2010 |
| JP | 2011055246 A | 3/2011 |
| WO | 2017030236 A1 | 2/2017 |

OTHER PUBLICATIONS

First Office Action of the Chinese application No. 201710558403.1, dated Jul. 10, 2018.
Notice of Allowance of the Chinese application No. 201710558403.1, dated Jan. 29, 2019.
English translation of the Written Opinion of the International Search Authority in the international application No. PCT/CN2018/090587, dated Aug. 8, 2018.
Supplementary European Search Report in the European application No. 18832138.4, dated May 4, 2020.
First Office Action of the European application No. 18832138.4, dated Feb. 5, 2021.
Office Action of the Indian application No. 202017002212, dated Mar. 16, 2021.
International Search Report in the international application No. PCT/CN2018/094593, dated Sep. 26, 2018.
Written Opinion of the International Search Authority in the international application No. PCT/CN2018/094593, dated Sep. 26, 2018.
European Search Report in the European application No. 18179461.1, dated Aug. 16, 2018.
First Office Action of the European application No. 18179461.1, dated Jul. 31, 2019.
Second Office Action of the European application No. 18179461.1, dated Apr. 28, 2020.
First Office Action of the Chinese application No. 201710557982.8, dated May 7, 2019.
Second Office Action of the Chinese application No. 201710557982.8, dated Oct. 11, 2019.
Third Office Action of the Chinese application No. 201710557982.8, dated Feb. 6, 2020.
Non-Final Office Action of the U.S. Appl. No. 16/003,984, dated Jan. 8, 2020.
Final Office Action of the U.S. Appl. No. 16/003,984, dated Apr. 15, 2020.
Non-Final Office Action after RCE of the U.S. Appl. No. 16/003,984, dated Aug. 21, 2020.
Notice of Allowance of the U.S. Appl. No. 16/003,984, dated Nov. 18, 2020.
Notice of Rejection of the Chinese application No. 201710557982.8, dated Jun. 3, 2020.
Notice of Re-examination of the Chinese application No. 201710557982.8, dated Jan. 20, 2021.
Notice of Advisory Action of the U.S. Appl. No. 16/003,984, dated Jun. 24, 2020.

* cited by examiner

WHITE BALANCE SYNCHRONIZATION METHOD AND APPARATUS, AND TERMINAL DEVICE

CROSS-REFERENCE TO RELATED APPLICATIONS

This application is a continuation of International Application No. PCT/CN2018/090587, filed on Jun. 11, 2018, which claims priority to Chinese Patent Application No. 201710558403.1, filed on Jul. 10, 2019 by Guangdong OPPO Mobile Telecommunications Corp. Ltd., and entitled "White Balance Synchronization Method and Apparatus, and Terminal Device". The contents of these disclosures are hereby incorporated by reference in their entirety.

BACKGROUND

Along with development of sciences and technologies, photographic devices such as a camera and a video camera have been applied extensively to people's daily lives, work and study, and become increasingly important in people's lives. When an image is shot by using a photographic device, control of white balance is required to ensure real reproduction of a color in a scene of the image.

In related art, a terminal includes two cameras, both the two cameras work independently, and when switching between the two cameras are performed, one camera exits and the other camera, after being activated, is required to start convergence by taking a gain value acquired when the activated camera exits last time as an initial value for white balance adjustment. However, according to such a white balance adjustment manner, if a shooting scene acquired when the activated camera exits previously is greatly different from a present shooting scene, a white balance adjustment process is relatively time-consuming, resulting in poor user experience.

SUMMARY

The disclosure relates to the technical field of photographing, and more particularly, to a white balance synchronization method and device, and a terminal device.

A purpose of the disclosure is to solve one of the technical problems at least to a certain extent.

To this end, the disclosure provides a white balance synchronization method. In accordance with performing a switch between cameras, a second camera performs convergence for white balance adjustment according to a gain value of a first camera prior to switching as an initial value, so that the problem of image flickering on the screen is solved, and thus speed of white balance adjustment is increased, and a user experience is improved.

The disclosure also provides a white balance synchronization device.

The disclosure also provides a terminal device.

The disclosure also provides a computer-readable storage medium.

The disclosure also provides a computer program product.

An aspect of embodiments of the disclosure provides a white balance synchronization method, which may be applied to a terminal including at least two cameras and include the following operations.

A first gain value of a first camera that is in use is acquired in response to determining that the terminal is to perform a switch between cameras.

White balance of an image captured by a second camera is adjusted according to the first gain value as an initial value in response to activation of the second camera.

According to the white balance synchronization method provided in the embodiments of the disclosure, the first gain value of the first camera that is in use is acquired in accordance with performing a switch between cameras, and in response to activation of the second camera, white balance of an image captured by the second camera is adjusted according to the first gain value as the initial value. In such a manner, in accordance with performing the switch between cameras, the second camera performs convergence according to a gain value of the first camera prior to switching as the initial value for white balance adjustment, so that the problem of image flickering on the screen is solved, and thus a white balance adjustment speed is increased, and a user experience is improved.

Another aspect of the embodiments of the disclosure provides a white balance synchronization device, which may be applied to a terminal including at least two cameras and include an acquisition module and an adjustment module.

The acquisition module may be configured to: acquiring a first gain value of a first camera that is in use in response to determining that the terminal is to perform a switch between cameras.

The adjustment module may be configured to: adjust white balance of an image captured by a second camera according to the first gain value as an initial value in response to activation of the second camera.

According to the white balance synchronization device provided in the embodiments of the disclosure, the first gain value of the first camera that is in use is acquired in response to determining that the terminal is to perform a switch between cameras, and white balance of the image captured by the second camera is adjusted according to the first gain value as the initial value in response to activation of the second camera. In such a manner, in accordance with performing a switch between cameras, the second camera performs convergence according to a gain value of the first camera prior to switching as the initial value for white balance adjustment, so that the problem of image flickering on the screen is solved, and thus speed of white balance adjustment is increased, and a user experience is improved.

Another aspect of the embodiments of the disclosure provides a terminal device, which may include a shell, a processor, a memory, a circuit board, a power circuit and at least two cameras. The circuit board may be arranged within a space enclosed by the shell. The processor and the memory may be arranged on the circuit board. The power circuit may be configured to supply power to each circuit or device of the terminal device. The memory may be configured to store an executable program code. The processor may be configured to read the executable program code stored in the memory and execute a program corresponding to the executable program code to implement the white balance synchronization method of the abovementioned embodiments.

According to the terminal device provided in the embodiments of the disclosure, a first gain value of a first camera that is in use is acquired in response to determining that the terminal is to perform a switch between cameras, and in response to activation of a second camera, white balance of an image captured by the second camera is adjusted according to the first gain value as an initial value. In such a manner, in accordance with performing the switch between cameras, the second camera performs convergence according to a gain value of the first camera prior to switching as the initial value, so that the problem of image flickering on the screen is solved for white balance adjustment, and thus speed of white balance adjustment is increased, and a user experience is improved.

Another aspect of the embodiments of the disclosure provides a computer-readable storage medium, having stored thereon a computer program that, when being executed by a processor, implements the white balance synchronization method of the abovementioned embodiments.

The computer-readable storage medium provided in the embodiments of the disclosure may be provided within any terminal including at least two cameras and required to perform white balance adjustment. During adjustment of white balance, the white balance synchronization method stored therein may be executed to enable a second camera, after switching between cameras is completed, to perform convergence according to a gain value of a first camera prior to switching as an initial value for white balance adjustment, so that the problem of image flickering on the screen is solved, and thus speed of white balance adjustment is increased, and a user experience is improved.

Another aspect of the embodiments of the disclosure discloses a computer program product, having stored therein an instruction that, when being executed by a processor, implements the white balance synchronization method of the abovementioned embodiments.

The computer program product provided in the embodiments of the disclosure may be provided in any terminal including at least two cameras and required to perform white balance adjustment. During white balance adjustment, a program corresponding to a white balance synchronization method may be executed to enable a second camera, after switching between cameras is completed, to perform convergence according to a gain value of a first camera prior to switching as an initial value for white balance adjustment, so that the problem of image flickering on the screen is solved, and thus speed of white balance adjustment is increased, and a user experience is improved.

Additional aspects and advantages of the disclosure will be presented in the following descriptions and partially become apparent from the following descriptions or be learned by practice of the disclosure.

BRIEF DESCRIPTION OF DRAWINGS

In order to describe the technical solutions in the embodiments of the disclosure or a conventional art more clearly, the drawings required to be used in descriptions about the embodiments or the conventional art will be simply introduced below. It is apparent that the drawings described below are only some embodiments of the disclosure. Other drawings may further be obtained by those of ordinary skill in the art according to these drawings without creative work.

DETAILED DESCRIPTION

A double-camera control method and device of the embodiments of the disclosure will be described below in combination with the drawings in detail.

It is to be noted that the described embodiments are not all embodiments but only part of embodiments of the disclosure. All other embodiments obtained by those of ordinary skill in the art based on the embodiments in the disclosure without creative work shall fall within the scope of protection of the disclosure.

A white balance synchronization method and device and terminal device of the embodiments of the disclosure will be described below with reference to the drawings.

Under a normal circumstance, when a photographic device shoots an image, a color temperature value of a present image may be determined according to color temperature values of multiple continuous frames of images, and thus a white balance gain value corresponding to white balance adjustment of the present image is determined.

In such a manner, determination of a color temperature value of the present image is time-consuming, and thus the time for white balance adjustment is relatively long. Therefore, in the embodiments of the disclosure, an initial value may be preset, and thus when the photographic device shoots the present image, white balance of the present image may be directly regulated and converged based on the initial value, so that the time for white balance adjustment is shortened.

In the related art, a terminal includes two cameras, both of which are independently operable, and in response to performing a switch between cameras, one camera exits and the other camera is activated. The activated camera is required to perform convergence for white balance adjustment according to a gain value when the activated camera last exits as an initial value. In such a manner, a shooting scene when the activated camera last exits may be different from a present shooting scene, which results in a problem of image flickering on the screen due to a great difference between color temperature values of different scenes if the gain value of the shooting scene when the activated camera last exits an operating mode is taken as the initial value. If the gain value of the shooting scene when the activated camera last exit the operating mode is taken as the initial value, the initial value may be greatly different from a target gain value. The target gain value refers to a corresponding gain value when colors of the scene of the image may be truly reproduced. Adjustment of the gain value is performed gradually when convergence is performed from the initial value, and thus if a difference between the initial value and the target gain value is greater, the consumed time during white balance adjustment is longer. Therefore, when white balance adjustment is performed in the existing manner, the problem of image flickering occurs easily, and the white balance adjustment is time-consuming, and thus a user experience is poor.

For solving the problems, various embodiment of the disclosure provide a white balance synchronization method. In response to determining that a terminal is to perform a switch between cameras, a first gain value corresponding to a first camera that is presently used is acquired, and in response to activation of a second camera, white balance of an image captured by the second camera is adjusted according to the first gain value as an initial value. In such a manner, in accordance with performing switch between cameras, the second camera performs convergence for white balance adjustment according to a gain value of the first camera prior to switching as the initial value, so that the problem of image flickering on the screen is solved, and thus speed of white balance adjustment is increased, and a user experience is improved.

The white balance synchronization method of the embodiments of the disclosure will be described below in combination with FIG. 1.

Figure 1:
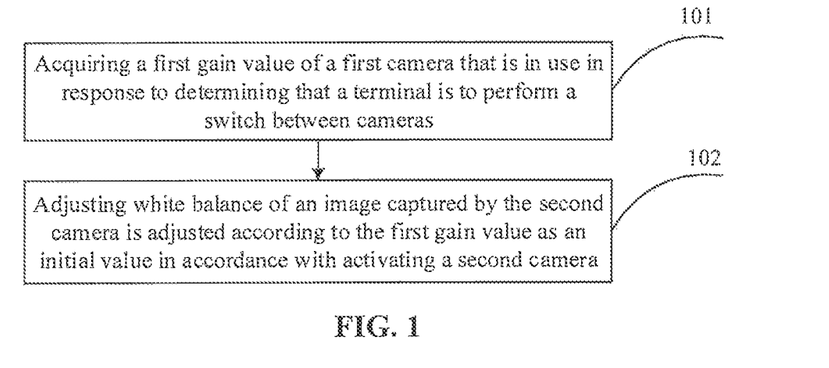
FIG. 1 is a flowchart of a white balance synchronization method according to an embodiment of the disclosure.

FIG. 1 is a flowchart of a white balance synchronization method according to an embodiment of the disclosure.

As illustrated in FIG. 1, the method includes the following operations.

In operation 101, a first gain value of a first camera that is in use is acquired in response to determining that a terminal is to perform a switch between cameras.

Specifically, the white balance synchronization method provided in the embodiment of the disclosure may be executed by a white balance synchronization device provided in the embodiments of the disclosure. Specifically, the white balance synchronization device may be applied to any terminal device including at least two cameras. The terminal device may be of many types and may be selected according to an application requirement, for example, a mobile phone, a computer and a camera.

It is to be noted that the white balance synchronization method provided in the embodiment of the disclosure may be applied to a terminal including at least two cameras. In the embodiment of the disclosure, the white balance synchronization method is described with the terminal including two cameras as an example.

The gain value may include gain values of three channels Red (R), Green (G) and Blue (B) in the image acquired by an image sensor.

Specifically, multiple manners may be adopted to determine that the terminal is to perform switch between cameras.

First Manner

It is determined according to a present shooting state of the terminal that the terminal is to perform the switch between cameras.

The present shooting state of the terminal may include at least one of the following: a present light environment or zooming factor and the like.

It may be understood that during shooting of the terminal, each camera of the terminal has a proper shooting state and, when the present camera is mismatched with the present shooting state, it may be determined that the terminal is to perform switch between cameras.

For example, a camera a is suitable for shooting in an environment with a high light intensity, and a camera b is suitable for shooting in an environment with a low light intensity; and the camera a is suitable for a zooming factor within a range from 0 to 2, and the camera b is suitable for a zooming factor more than 2, etc. Then, during use of the terminal, one or more proper cameras may be selected according to a desired requirement of a user, the present light environment and zooming factor and the like so as to shoot an image with a better effect.

When the camera a is presently used for shooting, if it is determined determining that a present light intensity is low, and the camera b is suitable for shooting in the environment with the low light intensity, it may be determined that the terminal is to perform the switch between cameras at present; or, if it is determined that the present zooming factor is 4 and the camera b is suitable for shooting an image with the zooming factor more than 2, it may be determined that the terminal is to perform the switch between cameras.

Second Manner

It is determined according to an acquired instruction for switching between cameras (or, camera switching instruction) that the terminal is to perform switching between cameras.

The instruction for switching between cameras may be a camera switching instruction generated in an automatic trigger when the shooting state of the terminal changes, and may also be a camera switching instruction generated by the user in a manual trigger according to a requirement. There are no limits made herein.

During specific implementation, when a user determines to switch the camera according to the requirement, the camera switching instruction may be generated by covering the camera required to exit using a masker, or by touching a button with a camera switching function through an operation such as clicking, long pressing or through another operation. After acquiring the camera switching instruction, the white balance synchronization device may determine that the terminal is to perform switch between cameras.

In operation 102, in accordance with activating a second camera, white balance of an image captured by the second camera is adjusted according to the first gain value as an initial value.

Specifically, the first gain value of the first camera that is in use may be acquired in accordance with performing a switch between cameras. In response to activation of the second camera, convergence is performed by using the first gain value as the initial value to adjust white balance of the image acquired by the second camera.

Under a normal circumstance, when the average value of three components R, G and B color vectors in all pixels of the image tends to balance (1:1:1), a gain value corresponding to the second camera is an accurate target gain value.

During specific implementation, when white balance adjustment is performed, since human eyes are most sensitive to light belonging to a green light wavelength (480 nm-600 nm) in a frequency spectrum and the number of green pixel point acquired in a Bayer array is greatest, a gain value of the component G may be fixed and then gain values of the component R and B are regulated to implement adjustment of the component R and B, so that the average of the three component R, G and B color vectors in all pixels of the image tends to balance (1:1:1), thereby implementing truly reproduction of colors in a scene of the image.

It is to be noted that in the embodiment of the disclosure, a gain value corresponding to a camera may also be acquired in real time in use of the camera. Therefore, after the second camera is activated, a gain value corresponding to a last frame of image shot by the first camera prior to switching between cameras may be determined as the first gain value, and white balance adjustment is performed on the image acquired by the second camera by using the first gain value as the initial value.

It is to be noted that in a practical application process, a shooting scene of the second camera after being activated may be different from a shooting scene of the first camera in accordance with performing a switch between cameras. If convergence is performed directly according to the first gain value of the first camera as the initial value to adjust white balance of the image captured by the second camera, the problem of image flickering or long white balance adjustment time due to a great difference between color temperature values of different scenes may exist. Therefore, in the embodiment of the disclosure, before the first gain value is used as the initial value, the method may further include the following operations.

It is determined that a position of the terminal is unchanged.

And/or, it is determined that an image acquired by the terminal is unchanged.

And/or, it is determined that a second color temperature value corresponding to the present image acquired by the second camera is matched with a first color temperature value corresponding to a last frame of image acquired by the first camera.

Correspondingly, before operation 102, the method may further include the following operation.

The first color temperature value corresponding to the last frame of image acquired by the first camera is acquired.

Specifically, when the position of the terminal is unchanged, or the image acquired by the terminal is unchanged, or the position of the terminal is unchanged and the image acquired by the terminal is unchanged before and after switching of cameras, shooting scenes or objects of the two cameras may be unchanged, and correspondingly, color temperature values of the two scenes may be unchanged. Then, when white balance adjustment is performed on the image acquired by the second camera by taking the first gain value corresponding to the first camera as the initial value after the second camera is activated, since a color temperature value does not change, the problem of image flickering on the screen may be solved and a difference between the initial value and a target gain value is small, so that white balance adjustment time is reduced.

In addition, a range of a difference between the first color temperature value and the second color temperature value may be preset, and when the difference between the first color temperature value and the second color temperature value is within the preset range, it may be considered that the second color temperature value is matched with the first color temperature value. Therefore, when white balance adjustment is performed on the image acquired by the second camera by taking the first gain value corresponding to the first camera as the initial value after the second camera is activated, the problem of image flickering on the screen can be solved and the difference between the initial value and the target gain value is small, so that the white balance adjustment time is reduced.

According to the white balance synchronization method provided in the embodiment of the disclosure, the first gain value corresponding to the presently used first camera is acquired in response to determining that the terminal is to perform a switch between cameras, and in accordance with activating the second camera, white balance of the image captured by the second camera is adjusted according to the first gain value as the initial value. In such a manner, after switch between cameras is performed, the second camera performs convergence for white balance adjustment according to a gain value of the first camera prior to switching as the initial value, so that the problem of image flickering on the screen is solved, and thus speed of white balance adjustment is increased, and a user experience is improved.

From the above analysis, the first gain value of the first camera that is in use may be acquired in response to determining that the terminal is to perform a switch between cameras, and in accordance with activating the second camera, when the second color temperature value corresponding to the present image acquired by the second camera is matched with the first color temperature value corresponding to the last frame of image acquired by the first camera, white balance of the image captured by the second camera is adjusted according to the first gain value as the initial value. During practical application, the second color temperature value corresponding to the present image acquired by the second camera may be mismatched with the first color temperature value corresponding to the last frame of image acquired by the first camera, which will be described below in combination with FIG. 2 in detail.

Figure 2:
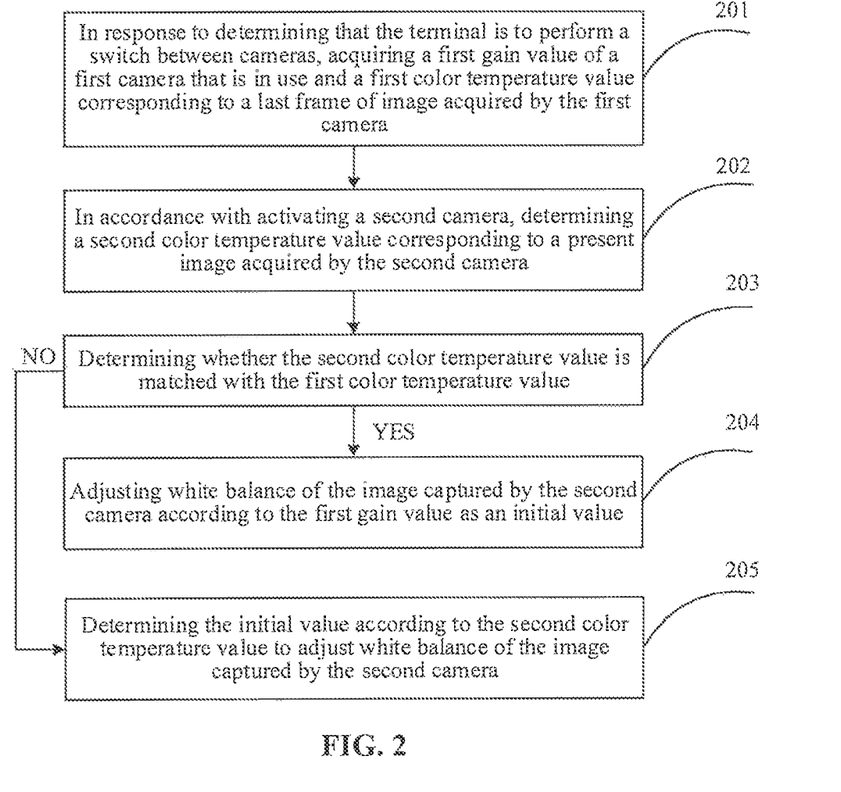
FIG. 2 is a flowchart of a white balance synchronization method according to another embodiment of the disclosure.

FIG. 2 is a flowchart of a white balance synchronization method according to another embodiment of the disclosure.

As illustrated in FIG. 2, the white balance synchronization method is applied to a terminal including at least two cameras, and the method includes the following operations.

In operation 201, in response to determining that the terminal is to perform a switch between cameras, a first gain value of a first camera that is in use and a first color temperature value corresponding to a last frame of image acquired by the first camera are acquired.

In operation 202, in accordance with activating a second camera, a second color temperature value corresponding to a present image acquired by the second camera is determined.

Specifically, a color temperature value corresponding to each white block in the last frame of image acquired by the first camera or a color temperature value corresponding to a region where a target shooting object is located may be determined as the first color temperature value. Or, the first color temperature value corresponding to the last frame of image acquired by the first camera may also be determined according to another manner. There are no limits made herein.

It is to be noted that a process of determining the second color temperature value is similar to a process of determining the first color temperature value and will not be elaborated herein.

In operation 203, it is determined whether the second color temperature value is matched with the first color temperature value, if the second color temperature value is matched with the first color temperature value, operation 204 is executed, and the second color temperature value is mismatched with the first color temperature value, operation 205 is executed.

In operation 204, white balance of the image captured by the second camera is adjusted according to the first gain value as an initial value.

A specific implementation process and principle of operations 201 to 204 may refer to detailed descriptions about operations 101 to 102 in the abovementioned embodiment and will not be elaborated herein.

In operation 205, the initial value is determined according to the second color temperature value to adjust white balance of the image captured by the second camera.

Specifically, when the second color temperature value is mismatched with the first color temperature value, the initial value may be determined according to a preset rule.

The preset rule may be set according to requirements. For example, the preset rule may be set according to an instruction of a user or another triggering condition, which is not limited herein.

Specifically, a mapping relationship between the second color temperature value and the initial value may be preset, and after the second color temperature value corresponding to the present image acquired by the second camera is determined, the initial value may be determined according to the preset mapping relationship.

Or, the initial value may be determined according to a difference between the second color temperature value corresponding to the present image acquired by the second camera and the first color temperature value corresponding to the last frame of image acquired by the first camera.

For example, a difference threshold and an initial gain value may be preset. When the difference between the second color temperature value and the first color temperature value is less than the preset difference threshold, the gain value corresponding to the last frame of image acquired by the first camera is determined as the initial value, and when the difference between the second color temperature value and the first color temperature value is more than or equal to the preset difference threshold, the initial gain value is determined as the initial value.

The difference threshold and the initial gain value may be set according to requirements. For example, the initial gain value may be empirically set to be a gain value at a D50 color temperature, or the difference threshold and the initial gain value may be set according to another condition. There are no limits made herein.

For example, it is assumed that the difference threshold is 2,000, the initial gain value is a gain value at a D50 color temperature, the gain value corresponding to the last frame of image acquired by the first camera is A, and the second color temperature value corresponding to the image presently acquired by the second camera is 4,000. If the first color temperature value corresponding to the last frame of image acquired by the first camera is 2,700, since the difference 1,300 between the second color temperature value and the first color temperature value is less than the difference threshold 2,000, A may be determined as the initial value. If the first color temperature value corresponding to the last frame of image acquired by the first camera is 1,700, since the difference 2,300 between the second color temperature value and the first color temperature value is more than the difference threshold 2,000, the gain value at the D50 color temperature may be determined as the initial value.

Or, a gain correction value may be determined according to the difference between the first color temperature value corresponding to the last frame of image acquired by the first camera and the second color temperature value, and then the initial value is determined according to the gain value corresponding to the last frame of image acquired by the first camera and the gain correction value.

The gain correction value is used to correct the gain value corresponding to the last frame of image acquired by the first camera into the initial value.

During specific implementation, a correspondence between the gain correction value and the difference between the second color temperature value and the first color temperature value may be preset. Therefore, after the second color temperature value and the first color temperature value are determined, the gain correction value may be determined according to the difference between the second color temperature value and the first color temperature value, and the initial value may be obtained through the gain correction value according to the gain value corresponding to the last frame of image acquired by the first camera.

For example, it is assumed that the gain correction value is 0 when a range of the difference between the second color temperature value and the first color temperature value is 0-2,000K; the gain correction value is 1 when the range of the difference between the second color temperature value and the first color temperature value is 2,0001K-2,500K; and the gain correction value is 2 when the range of the difference between the second color temperature value and the first color temperature value is 2,501K to 3,000K. When it is determined that the second color temperature value corresponding to the present image acquired by the second camera is 2,700, the first color temperature value corresponding to the last frame of image acquired by the first camera is 4,500K and the corresponding gain value is A, it may be determined, according to the difference 1,800K between the second color temperature value and the first color temperature value and the preset correspondence between the gain correction value and the difference, that the gain correction value is 0, namely the initial value is A.

It is to be noted that the method of determining the initial value according to the second color temperature value is only schematically described and is not intended to limit the technical solution of the disclosure. Those skilled in the art may freely set the method of determining the initial value according to the second color temperature value according to a requirement. There are no limits made herein.

According to the white balance synchronization method provided in the embodiment of the disclosure, in accordance with performing a switch between cameras, the first gain value of the first camera that is in use and the first color temperature value corresponding to the last frame of image captured by the first camera are acquired; and in response to activation of the second camera, the second color temperature value corresponding to the present image captured by the second camera is determined. Then, it is determined whether the second color temperature value is matched with the first color temperature value, if the second color temperature value is matched with the first color temperature value, the first gain value is determined as the initial value, and if the second color temperature value is mismatched with the first color temperature value, the initial value is determined according to the second color temperature value to adjust white balance of the image captured by the second camera. In such a manner, in accordance with performing the switch between cameras, a proper gain value may be provided as the initial value to perform convergence for white balance adjustment, so that the problem of image flickering on the screen is solved, and thus a white balance adjustment speed is increased, and a user experience is improved.

Figure 3:
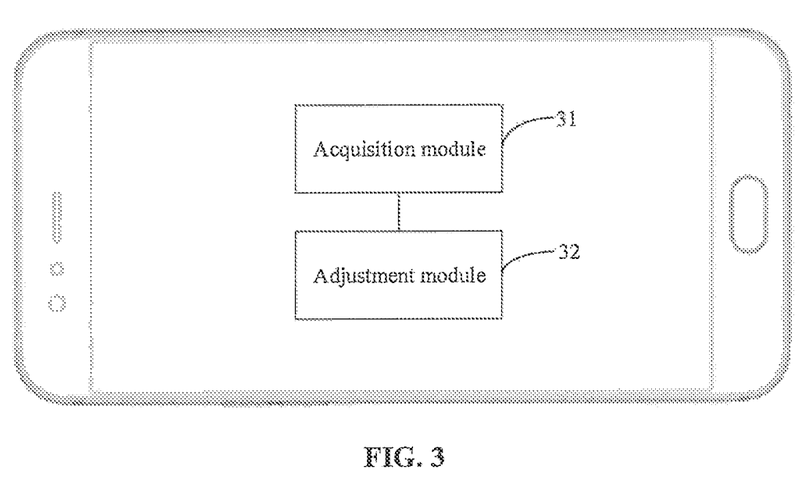
FIG. 3 is a structure diagram of a white balance synchronization device according to an embodiment of the disclosure.

FIG. 3 is a structure diagram of a white balance synchronization device according to an embodiment of the disclosure.

As illustrated in FIG. 3, the white balance synchronization device is applied to a terminal including at least two cameras, and the device includes an acquisition module 31 and an adjustment module 32.

The acquisition module 31 is configured to: acquire a first gain value of a first camera that is in use in response to determining that the terminal is to perform a switch between cameras.

The adjustment module 32 is configured to: in response to activation of a second camera, adjust white balance of an image captured by the second camera according to the first gain value as an initial value.

The white balance synchronization device provided in the embodiment may execute a white balance synchronization method provided in the embodiments of the disclosure. Specifically, the white balance synchronization device may be applied to any terminal device including at least two cameras. The terminal device may be of many types and may be selected according to an application requirement, for example, a mobile phone, a computer and a camera.

In a possible implementation of the embodiment, the acquisition module 31 is specifically configured to: determine according to a present shooting state of the terminal that the terminal is to perform the switch between cameras; or, determine, according to an acquired instruction for switching between cameras, that the terminal is to perform the switch between cameras.

The present shooting state of the terminal may include at least one of the following: a present light environment or zooming factor.

It is to be noted that explanations and descriptions about the white balance synchronization method in the abovementioned embodiment are also applied to the white balance synchronization device of the embodiment and elaborations are omitted herein.

According to the white balance synchronization device provided in the embodiment of the disclosure, the first gain value of the first camera that is in use is acquired in response to determining that the terminal is to perform a switch between cameras, and in response to activation of the second camera, white balance of the image captured by the second camera is adjusted according to the first gain value as the initial value. In such a manner, in response to performing switch between cameras, the second camera performs convergence for white balance adjustment according to a gain value of the first camera prior to switching as the initial value, so that the problem of image flickering on the screen is solved, and thus speed of white balance adjustment is increased and a user experience is improved.

Figure 4:
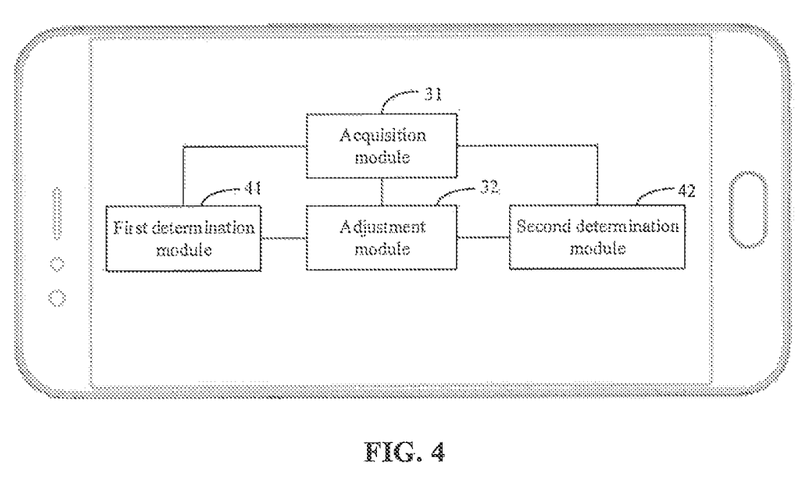
FIG. 4 is a structure diagram of a white balance synchronization device according to another embodiment of the disclosure.

FIG. 4 is a structure diagram of a white balance synchronization device according to another embodiment of the disclosure.

As illustrated in FIG. 4, based on FIG. 3, the white balance synchronization device further includes a first determination module 41 and a second determination module 42.

The first determination module 41 is configured to determine that a position of the terminal is unchanged, and/or, determine that an image acquired by the terminal is unchanged, and/or, determine that a second color temperature value corresponding to the present image acquired by the second camera is matched with a first color temperature value corresponding to a last frame of image acquired by the first camera.

The second determination module 42 is configured to: when it is determined that the second color temperature value is mismatched with the first color temperature, determine the initial value according to the second color temperature value.

In a possible implementation of the disclosure, the first determination module 41 is further configured to: determine the first color temperature value according to a color temperature value corresponding to a white block in the last frame of image acquired by the first camera.

In another possible implementation of the disclosure, the first determination module 41 is further configured to: determine the first color temperature value according to a color temperature value corresponding to a region where a target shooting object is located in the last frame of image acquired by the first camera.

In another possible implementation of the disclosure, the second determination module 42 is specifically configured to: determine the initial value according to a mapping relationship between the second color temperature value and the initial value; or, determine the initial value according to a difference between the second color temperature value corresponding to the present image acquired by the second camera and the first color temperature value corresponding to the last frame of image acquired by the first camera; or, determine a gain correction value according to the difference value between the first color temperature value corresponding to the last frame of image acquired by the first camera and the second color temperature value corresponding to the present image acquired by the second camera, and determine the initial value according to the gain value corresponding to the last frame of image acquired by the first camera and the gain correction value.

It is to be noted that the explanations and descriptions about the white balance synchronization method in the abovementioned embodiment are also applied to the white balance synchronization device of the embodiment and elaborations are omitted herein.

According to the white balance synchronization device provided in the embodiment of the disclosure, the first gain value of the first camera that is in use is acquired in response to determining that the terminal is to perform a switch between cameras, and in response to activation of the second camera, white balance of the image captured by the second camera is adjusted according to the first gain value as the initial value. In such a manner, in accordance with performing the switch between cameras, the second camera performs convergence for white balance adjustment according to a gain value of the first camera prior to switching as the initial value, so that the problem of image flickering on the screen is solved, and thus speed of white balance adjustment is increased, and a user experience is improved.

Another aspect of the embodiments of the disclosure also discloses a terminal device.

Figure 5:
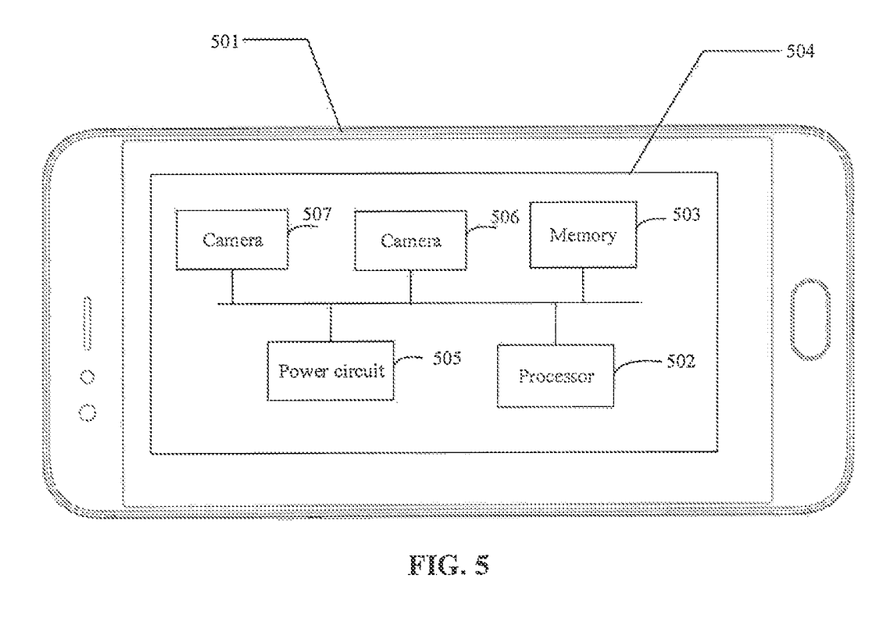
FIG. 5 is a structure diagram of a terminal device according to an embodiment of the disclosure.

FIG. 5 is a structure diagram of a terminal device according to an embodiment of the disclosure.

The terminal device may be of many types and may be selected according to an application requirement, for example, applied for a mobile phone, a computer and a camera. The terminal device illustrated in FIG. 5 is a mobile phone.

As illustrated in FIG. 5, the terminal device includes a shell 501, a processor 502, a memory 503, a circuit board 504, a power circuit 505 and at least two cameras. Two cameras 506 and 507 are schematically illustrated in FIG. 5.

The circuit board 504 is arranged within a space enclosed by the shell 501. The processor 502 and the memory 503 are arranged on the circuit board 504. The power circuit 505 is configured to supply power to each circuit or device of the terminal device. The memory 503 is configured to store an executable program code. The processor 502 is configured to execute a program corresponding to the executable program code by reading the executable program code stored in the memory 503 to implement the white balance synchronization method in the abovementioned embodiment, which includes the following operations.

A first gain value of a first camera that is in use is acquired in response to determining that the terminal is to perform a switch between cameras.

White balance of an image captured by the second camera is adjusted according to the first gain value as an initial value in accordance with activating the second camera.

It is to be noted that explanations and descriptions about the embodiment of the white balance synchronization method are also applied to the terminal device of the embodiment and its implementation principle is similar and will not be elaborated herein.

According to the terminal device provided in the embodiment of the disclosure, the first gain value corresponding to the presently used first camera is acquired In response to determining that the terminal is to perform a switch between cameras, and in response to activation of the second camera, white balance of the image captured by the second camera is adjusted according to the first gain value as the initial value. In such a manner, in accordance with performing the switch between cameras, the second camera performs convergence for white balance adjustment according to a gain value of the first camera prior to switching as the initial value, so that the problem of image flickering on the screen is solved, and thus speed of white balance adjustment speed is increased, and a user experience is improved.

An embodiment of the disclosure also discloses a computer-readable storage medium, in which a computer program is stored, where the computer program, when being executed by a processor, causes the processor to implement the white balance synchronization method in the abovementioned embodiment.

The computer-readable storage medium provided in the embodiment of the disclosure may be set in any terminal including at least two cameras and required to perform white balance adjustment. During adjustment of white balance, the white balance synchronization method stored therein may be executed to enable a second camera, in accordance with performing a switch between cameras, to perform convergence for white balance adjustment according to a gain value of a first camera before switching as an initial value, so that the problem of image flickering on the screen is solved, a white balance adjustment speed is increased, and a user experience is improved.

An embodiment of the disclosure also provides a computer program product, an instruction in the computer program product being executed by a processor to execute the white balance synchronization method of the abovementioned embodiment.

The computer program product provided in the embodiment of the disclosure may be set in any terminal including at least two cameras and required to perform white balance adjustment. During white balance adjustment, a program corresponding to the white balance synchronization method may be executed to enable a second camera, in accordance with performing a switch between cameras, to perform convergence for white balance adjustment according to a gain value of a first camera before switching as an initial value, so that the problem of image flickering on the screen is solved, a white balance adjustment speed is increased, and a user experience is improved.

It is to be noted that, in the disclosure, a relationship term such as first and second is adopted only to distinguish an entity or operation from another entity or operation and does not always require or imply existence of any practical relationship or sequence between these entities or operations. Moreover, terms "include" and "contain" or any other variant thereof is intended to cover nonexclusive inclusions, so that a process, method, object or device including a series of elements not only includes those elements but also includes other elements which are not clearly listed or further includes elements intrinsic to the process, the method, the object or the device. Under the condition of no more limitations, an element defined by the statement "including a/an . . . " does not exclude existence of the same other elements in a process, method, object or device including the element.

Logics and/or operations represented in the flowcharts or described herein in another manner, for example, may be considered as a fixed sequence list of executable instructions configured to realize the logic functions and may specifically implemented in any computer-readable medium for an instruction execution system, device or equipment (for example, a computer-based system, a system including a processor or another system capable of reading instructions from the instruction execution system, device or equipment and executing the instructions) to use or for use in combination with the instruction execution system, device or equipment. For the specification, "computer-readable medium" may be any device capable of including, storing, communicating with, propagating or transmitting a program for the instruction execution system, device or equipment to use or for use in combination with the instruction execution system, device or equipment. A more specific example (non-exhaustive list) of the computer-readable medium includes: an electric connection portion (electronic device) with one or more wires, a portable computer disk (magnetic device), a Random Access Memory (RAM), a Read-Only Memory (ROM), an Erasable Programmable ROM (EPROM) (or flash memory), an optical fiber device and a portable Compact Disc Read-Only Memory (CD-ROM). In addition, the computer-readable medium may even be paper or another medium on which the program may be printed because, for example, the paper or the other medium may be optically scanned then edited, explained or, when necessary, processed in another proper manner to obtain the program in an electronic manner for storage in the computer memory.

It is to be understood that each part of the disclosure may be implemented by hardware, software, firmware or a combination thereof. In the abovementioned implementation modes, multiple steps or methods may be implemented by software or firmware stored in a memory and executed by a proper instruction execution system. For example, in case of implementation with the hardware, like another implementation mode, any one or combination of the following technologies well-known in the art may be adopted for implementation: a discrete logic circuit with a logic gate circuit configured to realize a logic function for a data signal, an application-specific integrated circuit with a proper combined logic gate circuit, a Programmable Gate Array (PGA), a Field Programmable Gate Array (FPGA) and the like.

It is to be noted that, in the descriptions of the specification, the descriptions made with reference to terms "an embodiment", "some embodiments", "example", "specific example", "some examples" or the like refer to that specific features, structures, materials or characteristics described in combination with the embodiment or the example are included in at least one embodiment or example of the disclosure. In the specification, these terms are not always schematically expressed for the same embodiment or example. Moreover, the specific described features, structures, materials or characteristics may be combined in a proper manner in any one or more embodiments or examples. In addition, those skilled in the art may integrate and combine different embodiments or examples described in the specification and features of different embodiments or examples without conflicts.

In the descriptions of the specification, the descriptions made with reference to terms "an embodiment", "some embodiments", "example", "specific example", "some examples" or the like refer to that specific features, structures, materials or characteristics described in combination with the embodiment or the example are included in at least one embodiment or example of the disclosure. In the specification, these terms are not always schematically expressed for the same embodiment or example. Moreover, the specific described features, structures, materials or characteristics may be combined in a proper manner in any one or more embodiments or examples. In addition, those skilled in the art may integrate and combine different embodiments or examples described in the specification and features of different embodiments or examples without conflicts.

The embodiments of the disclosure have been illustrated or described above. However, it can be understood that the abovementioned embodiments are exemplary and should not be understood as limits to the disclosure and those of ordinary skill in the art may make variations, modifications, replacements, transformations to the abovementioned embodiments within the scope of the disclosure.

The invention claimed is:

1. A white balance synchronization method, applied to a terminal comprising at least two cameras, and the method comprising:
   acquiring a first gain value of a first camera that is in use and a first color temperature value corresponding to a last frame of an image acquired by the first camera, in response to determining that the terminal is to perform a switch between cameras;
   determining a second color temperature value corresponding to a present image acquired by a second camera in response to activation of the second camera;
   determining whether the second color temperature value is matched with the first color temperature value; and
   using the first gain value as an initial value in response to determining that the second color temperature value is matched with the first color temperature value, and determining the initial value according to the second color temperature value in response to determining that the second color temperature value is mismatched with the first color temperature value; and
   adjusting white balance of the image acquired by the second camera according to the initial value.

2. The method of claim 1, wherein determining that the terminal is to perform the switch between cameras comprises:
   determining, according to a present shooting state of the terminal, that the terminal is to perform the switch between cameras; or,
   determining, according to an acquired instruction for switching between cameras, that the terminal is to perform the switch between cameras.

3. The method of claim 2, wherein the present shooting state of the terminal comprises at least one of the following: a present light environment or a zooming factor.

4. The method of claim 1, wherein determining the initial value according to the second color temperature value comprises:
   determining the initial value according to a mapping relationship between the second color temperature value and the initial value; or,
   determining the initial value according to a difference between the second color temperature value corresponding to a present image acquired by the second camera and the first color temperature value corresponding to the last frame of image acquired by the first camera; or,
   determining a gain correction value according to the difference between the first color temperature value corresponding to the last frame of image acquired by the first camera and the second color temperature value corresponding to the present image acquired by the second camera; and determining the initial value according to the gain value corresponding to the last frame of image acquired by the first camera and the gain correction value.

5. The method of claim 4, wherein determining the initial value according to the difference between the second color temperature value corresponding to the present image acquired by the second camera and the first color temperature value corresponding to the last frame of the image acquired by the first camera comprises:
   comparing the difference between the second color temperature value corresponding to the present image acquired by the second camera and the first color temperature value corresponding to the last frame of the image with a difference threshold;
   when the difference between the second color temperature value corresponding to the present image acquired by the second camera and the first color temperature value corresponding to the last frame of image is less than the difference threshold, determining the gain value corresponding to the last frame of image acquired by the first camera as the initial value; and
   when the difference between the second color temperature value corresponding to the present image acquired by the second camera and the first color temperature value corresponding to the last frame of image is greater than or equal to the difference threshold, determining a preset initial gain value as the initial value.

6. The method of claim 1, wherein acquiring the first color temperature value corresponding to the last frame of the image acquired by the first camera comprises:
   determining the first color temperature value according to a color temperature value corresponding to a white block within the last frame of the image acquired by the first camera.

7. The method of claim 1, wherein acquiring the first color temperature value corresponding to the last frame of the image acquired by the first camera comprises:
   determining the first color temperature value according to a color temperature value corresponding to a region where a target shooting object is located in the last frame of the image acquired by the first camera.

8. A terminal device, comprising a shell, a processor, a memory, a circuit board, a power circuit and at least two cameras, wherein
   the circuit board is arranged within a space enclosed by the shell;
   the processor and the memory are arranged on the circuit board;
   the power circuit is configured to supply power to each circuit or device of the terminal device;
   the memory is configured to store an executable program code; and
   the processor is configured to execute a program corresponding to the executable program code by reading of the executable program code stored in the memory to:
   acquire a first gain value of a first camera that is in use and a first color temperature value corresponding to a last frame of an image acquired by the first camera, in response to determining that the terminal is to perform a switch between cameras;
   determine a second color temperature value corresponding to a present image acquired by a second camera in response to activation of the second camera;
   determine whether the second color temperature value is matched with the first color temperature value; and
   use the first gain value as an initial value in response to determining that the second color temperature value is matched with the first color temperature value, and determine the initial value according to the second color temperature value in response to determining that the second color temperature value is mismatched with the first color temperature value; and
   adjust white balance of the image acquired by the second camera according to the initial value.

9. The terminal device of claim 8, wherein the processor is configured to:
  determine, according to a present shooting state of the terminal, that the terminal is to perform the switch between cameras; or,
  determine, according to an acquired instruction for switching between cameras, that the terminal is to perform the switch between cameras.

10. The terminal device of claim 9, wherein the present shooting state of the terminal comprises at least one of the following: a present light environment or zooming factor.

11. The terminal device of claim 8, wherein the processor is configured to:
  determine the initial value according to a mapping relationship between the second color temperature value and the initial value; or,
  determine the initial value according to a difference between the second color temperature value corresponding to a present image acquired by the second camera and the first color temperature value corresponding to the last frame of the image acquired by the first camera; or,
  determine a gain correction value according to the difference between the first color temperature value corresponding to the last frame of image acquired by the first camera and the second color temperature value corresponding to the present image presently acquired by the second camera, and determine the initial value according to the gain value corresponding to the last frame of image acquired by the first camera and the gain correction value.

12. The terminal device of claim 8, wherein the processor is configured to:
  determine the first color temperature value according to a color temperature value corresponding to a white block within the last frame of the image acquired by the first camera.

13. The terminal device of claim 8, wherein the processor is configured to:
  determine the first color temperature value according to a color temperature value corresponding to a region where a target shooting object is located in the last frame of the image acquired by the first camera.

14. A non-transitory computer-readable storage medium, having a computer program stored thereon, wherein the program, when being executed by a processor, implements:
  obtaining a first gain value of a first camera that is in use and a first color temperature value corresponding to a last frame of an image acquired by the first camera, in response to determining that the terminal is to perform a switch between cameras;
  determining a second color temperature value corresponding to a present image acquired by a second camera in response to activation of the second camera;
  determining whether the second color temperature value is matched with the first color temperature value; and
  using the first gain value as an initial value in response to determining that the second color temperature value is matched with the first color temperature value, and determining the initial value according to the second color temperature value in response to determining that the second color temperature value is mismatched with the first color temperature value; and
  adjusting white balance of the image captured by the second camera according to the initial value.

* * * * *